US010049199B2

(12) United States Patent
Cecchi et al.

(10) Patent No.: US 10,049,199 B2
(45) Date of Patent: *Aug. 14, 2018

(54) SECURING A DEVICE USING GRAPHICAL ANALYSIS

(71) Applicant: International Business Machines Corporation, Armonk, NY (US)

(72) Inventors: Guillermo A. Cecchi, New York, NY (US); James R. Kozloski, New Fairfield, CT (US); Clifford A. Pickover, Yorktown Heights, NY (US); Irina Rish, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,072

(22) Filed: Jun. 19, 2015

(65) Prior Publication Data

US 2016/0275302 A1 Sep. 22, 2016

Related U.S. Application Data

(63) Continuation of application No. 14/661,252, filed on Mar. 18, 2015.

(51) Int. Cl.
*G06F 21/00* (2013.01)
*G06F 21/32* (2013.01)
(Continued)

(52) U.S. Cl.
CPC ........ *G06F 21/32* (2013.01); *G06F 17/30864* (2013.01); *G06F 21/316* (2013.01); *G06F 2221/2103* (2013.01)

(58) Field of Classification Search
CPC ... H04L 63/0861; H04L 9/3231; G06F 21/32; G06F 21/31; G06F 21/316
(Continued)

(56) References Cited

U.S. PATENT DOCUMENTS

| 6,476,830 | B1* | 11/2002 | Farmer | G06N 3/006 |
| | | | | 705/27.1 |
| 2004/0049386 | A1* | 3/2004 | Niemoeller | G10L 15/30 |
| | | | | 704/235 |

(Continued)

FOREIGN PATENT DOCUMENTS

| CN | 101833619 A | 9/2010 |
| CN | 102904798 A | 1/2013 |

(Continued)

OTHER PUBLICATIONS

Derawi, Mohammad O., et al. "Unobtrusive user-authentication on mobile phones using biometric gait recognition." Intelligent Information Hiding and Multimedia Signal Processing (IIH-MSP), 2010 Sixth International Conference on. IEEE, 2010.*

(Continued)

*Primary Examiner* — Syed Zaidi
(74) *Attorney, Agent, or Firm* — Cantor Colburn LLP; Yeen Tham

(57) ABSTRACT

Embodiments are directed to a computer system for securing an electronic device. The system includes at least one processor configured to receive at least one communication from an entity seeking to access the device. The at least one processor is further configured to generate a graph of the at least one communication from the entity seeking access to the device. The at least one processor is further configured to determine a difference between a cognitive trait of the entity seeking access to the device, and a cognitive identity of an entity authorized to access the device. The at least one processor is further configured to, based at least in part on (Continued)

a determination that the difference is greater than a threshold, deploy a security measure of the device.

7 Claims, 6 Drawing Sheets

(51) Int. Cl.
  *G06F 17/30* (2006.01)
  *G06F 21/31* (2013.01)
(58) Field of Classification Search
  USPC .............................................................. 726/4
  See application file for complete search history.

(56) References Cited

U.S. PATENT DOCUMENTS

| | | | | |
|---|---|---|---|---|
| 2012/0271882 | A1* | 10/2012 | Sachdeva | H04N 21/26258 709/204 |
| 2013/0311190 | A1* | 11/2013 | Reiner | G10L 25/48 704/270 |
| 2013/0326592 | A1* | 12/2013 | Yamada | H04M 1/67 726/4 |
| 2014/0089321 | A1* | 3/2014 | Engel | G06F 17/30699 707/748 |
| 2014/0317744 | A1* | 10/2014 | Turgeman | H04L 63/1408 726/23 |
| 2015/0067822 | A1* | 3/2015 | Randall | G06F 21/32 726/17 |
| 2015/0213244 | A1* | 7/2015 | Lymberopoulos | G06F 21/32 726/18 |

FOREIGN PATENT DOCUMENTS

| | | |
|---|---|---|
| CN | 102986164 A | 3/2013 |
| CN | 103843004 A | 6/2014 |

OTHER PUBLICATIONS

Weinshall, Daphna. "Cognitive authentication schemes safe against spyware." Security and Privacy, 2006 IEEE Symposium on. IEEE, 2006.*

Saevanee, Hataichanok, and Pattarasinee Bhatarakosol. "User authentication using combination of behavioral biometrics over the touchpad acting like touch screen of mobile device." Computer and Electrical Engineering, 2008. ICCEE 2008. International Conference on. IEEE, 2008.*

Bilmes, Jeff A., and Chris Bartels. "Graphical model architectures for speech recognition." IEEE signal processing magazine 22.5 (2005): 89-100.*

Kanneh, Andrea, and Ziad Sakr. "Biometric user verification using haptics and fuzzy logic." Proceedings of the 16th ACM international conference on Multimedia. ACM, 2008.*

Orozco Trujillo, Mauricio. A biometrics system based on haptics for user authentication in virtual environments. Diss. University of Ottawa (Canada), 2007.*

Alsulaiman, Fawaz A., et al. "Feature selection and classification in genetic programming: Application to haptic-based biometric data." Computational Intelligence for Security and Defense Applications, 2009. CISDA 2009. IEEE Symposium on. IEEE, 2009.*

Guillermo A. Cecchi, "Securing a Device Using Graphical Analysis" U.S. Appl. No. 14/661,252, filed Mar. 18, 2015.

List of IBM Patents or Patent Applications Treated as Related— Date Filed: Aug. 3, 2015; 2 page.

* cited by examiner

SECURING A DEVICE USING GRAPHICAL ANALYSIS

DOMESTIC PRIORITY

This application is a continuation of U.S. patent application Ser. No. 14/661,252, titled "SECURING A DEVICE USING GRAPHICAL ANALYSIS" filed Mar. 18, 2015, the content of which is incorporated by reference herein in its entirety.

BACKGROUND

The present disclosure relates generally to securing an electronic device, and more specifically, to securing an electronic device based on a graphical analysis of the communications made by a user of the device.

Security of electronic devices (e.g., a text or speech input device such as a smartphone, a tablet computer, a laptop computer, etc.) often relies on traditional security measures such as user passwords and biometrics (e.g., fingerprints, face recognition, etc.). These security measures may get compromised, and the electronic devices may be exposed to security breach as a result.

SUMMARY

Embodiments are directed to a computer program product having a computer readable storage medium having program instructions embodied therewith, wherein the computer readable storage medium is not a transitory signal per se. The program instructions are readable by at least one processor circuit to cause the at least one processor circuit to perform a method of securing a device. The method includes receiving, by the at least one processor circuit, at least one communication from an entity seeking access to the device. The method further includes generating, by the at least one processor circuit, a graph of the at least one communication from the entity seeking access to the device. The method further includes determining a difference between a cognitive trait of the entity seeking access to the device, and a cognitive identity of an entity authorized to access the device. The method further includes, based at least in part on a determination that the difference is greater than a threshold, deploying a security measure of the device.

Embodiments are further directed to a computer-implemented method for securing an electronic device. The method includes receiving, by at least one processor of a computer, at least one communication from an entity seeking access to the device. The method further includes generating, by the at least one processor of the computer, a graph of the at least one communication from the entity seeking access to the device. The method further includes determining a difference between a cognitive trait of the entity seeking access to the device, and a cognitive identity of an entity authorized to access the device. The method further includes, based at least in part on a determination that the difference is greater than a threshold, deploying a security measure of the device.

Embodiments are further directed to a computer system for securing an electronic device. The system includes at least one processor configured to receive at least one communication from an entity seeking access to the device. The at least one processor is further configured to generate a graph of the at least one communication from the entity seeking access to the device. The at least one processor is further configured to determine a difference between a cognitive trait of the entity seeking access to the device, and a cognitive identity of an entity authorized to access the device. The at least one processor is further configured to, based at least in part on a determination that the difference is greater than a threshold, deploy a security measure of the device.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of the present disclosure provide systems and methods that perform a graphical text analysis on the communications that an entity (e.g., a device user) attempting to access the device makes in order to identify a current cognitive trait of the entity attempting to access the device and a discrepancy between the current cognitive trait of the entity attempting to access the device and a cognitive identity of an entity (e.g., an authorized user) that is authorized to access the device. The term entity is used herein to refer to any existing or real thing, including individuals, groups and organizations. The term cognitive as used herein refers to neurophysiological actions of brain tissue. These actions may cause muscles to move measurably. These movements may produce gestures of the body, for example of the speech apparatus, in order to effect a change in the environment, for example speech sounds. The term communications is used herein to include any of measurable action deriving from brain tissue, including neurophysiological, muscle movements, gestures, or changes to the environment, including speech sounds. The systems and methods triggers a security measure if the discrepancy between the current cognitive trait and the cognitive identify is greater than a threshold. That is, the systems and methods determine that the device user using an electronic device is a user who is authorized to use the electronic device when the determined discrepancy does not exceed the threshold, and determine that the device user is not an authorized user if the discrepancy exceeds the threshold.

Specifically, in some embodiments, the systems and methods create topological models of text and speech-to-text input to an electronic device that are user specific. These models are compact, easy to compute, and indicative of the identity of a device user, representing the user's cognitive traits in a profile that is difficult to spoof. These cognitive profiles are then used to buttress existing security measures on an electronic device, which may be foiled, thus ensuring a hacked device continually impose certain security tests upon its user, and that these continuous monitoring tests are difficult to spoof continuously.

Figure 1:
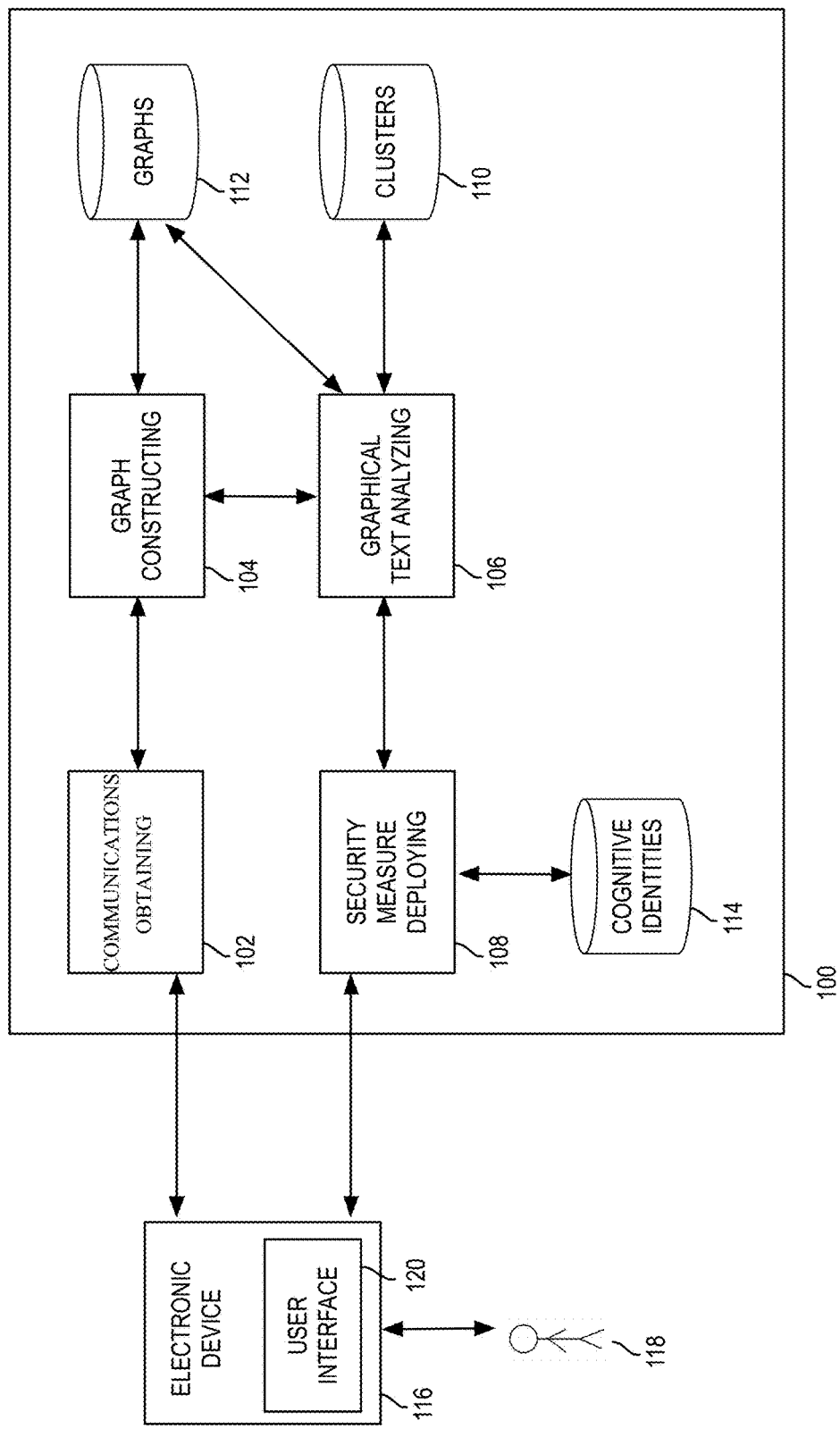
FIG. 1 depicts a system for securing an electronic device according to an embodiment of the present disclosure.

FIG. 1 illustrates a system 100 for deploying a security measure on a device. In some embodiments, the system 100 includes modules, sub-modules and data-stores such as a communications obtaining module 102, a graph constructing module 104, a graphical text analyzing module 106, a security measure deploying module 108, a clusters repository 110, a graphs repository 112, and a cognitive identities repository 114. FIG. 1 also illustrates an electronic device 116 and a device user 118.

The electronic device 116 is a device that is capable of receiving or gathering communications (e.g., text, spoken words, emails) made by the device user 118. For instance, an electronic device includes a mobile device such as a smartphone, a smartwatch, a tablet computer, a laptop computer, etc. as well as stationary devices such as a desktop computer, a mainframe, etc. The electronic device 116 may include one or more microphones to receive audio communications made by the device user 118. The electronic device 103 may include one or more means of receiving textual communications from the device user 118, such as a virtual or physical keyboard or keypad.

In some embodiments, the electronic device 116 may employ one or more security measures, including a finger print scanner, a passcode/password lock, face recognition techniques, voice recognition techniques, etc., which prevent unauthorized access to the electronic device 116. As will be described herein, the communications received at the electronic device 116 are analyzed by the system 100 to augment or trigger the security measures.

The device user 118 is a person that attempts to use the electronic device 116 by meeting the security measures or by getting around the security measures. That is, the device user 118 may be an authorized or unauthorized user of the device. The device user 118 may comprise a single person or a group of persons who attempt to use the electronic device 116. A group of persons that comprise the device user 118 may include, e.g., members of a family sharing the electronic device, several people in a social network, several people in a classroom, members of a team at a workplace, etc.

The communications obtaining module 102 obtains the textual and/or audio communications received at the electronic device 116 by receiving or retrieving the communications from the electronic device 116. The communications obtaining module 102 may also convert any audio communications into textual communications using one or more now known or later developed speech-to-text techniques. The communications include not only the communications that the device user 132 directly inputs to the electronic device 116 but also the communications received via the electronic device 116 from various other sources. These sources include, for example, emails, instant messages, social media content (e.g., tweets, Facebook content, etc.), phone calls, faxes, multimedia chats, etc.

The graph constructing module 104 receives the text of the device user's communications from the communications obtaining module 102. The graph constructing module 104 then builds a graph from the received data for the device user 118. More specifically, in some embodiments, the graph constructing module 104 extracts syntactic features from the received text and converts the extracted features to vectors. These syntactic vectors may have binary components for the syntactic categories such as verb, noun, pronoun, adjective, lexical root, etc. For instance, a vector [0,1,0,0 . . . ] represents a noun-word in some embodiments.

The graph constructing module 104 may also generate semantic vectors from the received text using one or more now known or later developed techniques (e.g., Latent Semantic Analysis and WordNet). The semantic content of each communication in the text may be represented by a vector, of which the components are determined by Singular Value Decomposition of word co-occurrence frequencies over a large database of documents.

A graph generated by the graph constructing module 104 may be in the form of: $G=\{N, E, \breve{W}\}$, where the nodes N represent tokens (e.g., words or phrases), the edges E represent temporal precedence in the device user's communications, and each node possesses a feature vector $\breve{W}$ defined in some embodiments as a direct sum of the syntactic and semantic vectors and additional non-textual feature vector (e.g., a predetermined vector for the identity of a person). That is, in some embodiments, the feature vector $\breve{W}$ is defined by the equation: $\breve{W}=\breve{w}_{sym}\oplus\breve{w}_{sem}\oplus\breve{w}_{ntxt}$, where $\breve{W}$ is the feature vector, $\breve{w}_{sym}$ is the syntactic vector, $\breve{w}_{sem}$ is the semantic vector, and $\breve{w}_{ntxt}$ is the non-textual features.

Figure 2:
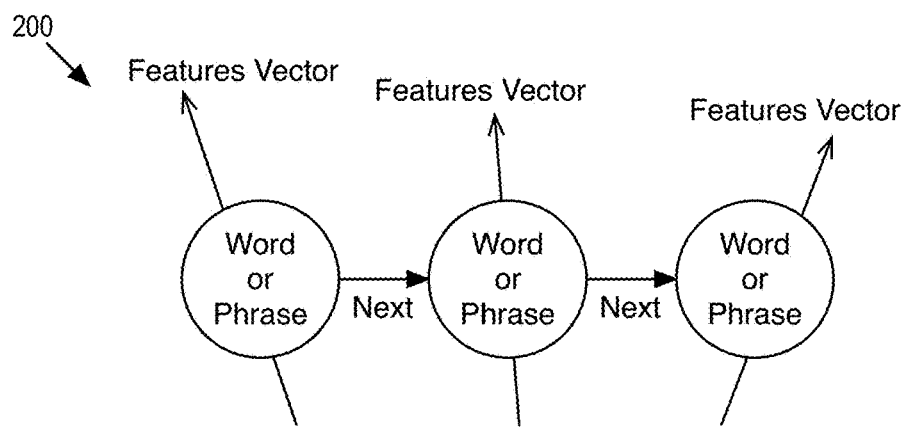
FIG. 2 depicts a graph of communications according to an embodiment of the disclosure.

An example graph 200 that may be generated by the graph constructing module 104 is shown in FIG. 2. As shown, the graph 200 is a directed graph that includes an ordered set of communications (e.g., words or phrases), each with a feature vector. Loops may form in this graph if the same communications are made more than once. When the device user 118 represents one person, the graph constructing module 104 builds one graph that includes communications of the person. When the device user 118 represents a group of persons, the graph constructing module 104 builds one graph including communications of all persons in the group or one graph for each person in the group. As will be described further below, in some embodiments, an avatar operating in the electronic device 116 may be teamed up with the device user 118. In these embodiments, the graph constructing module 104 may build one graph that includes communications of the person(s) represented by the device user 118 as well as the communications made by the avatar.

Figure 3:
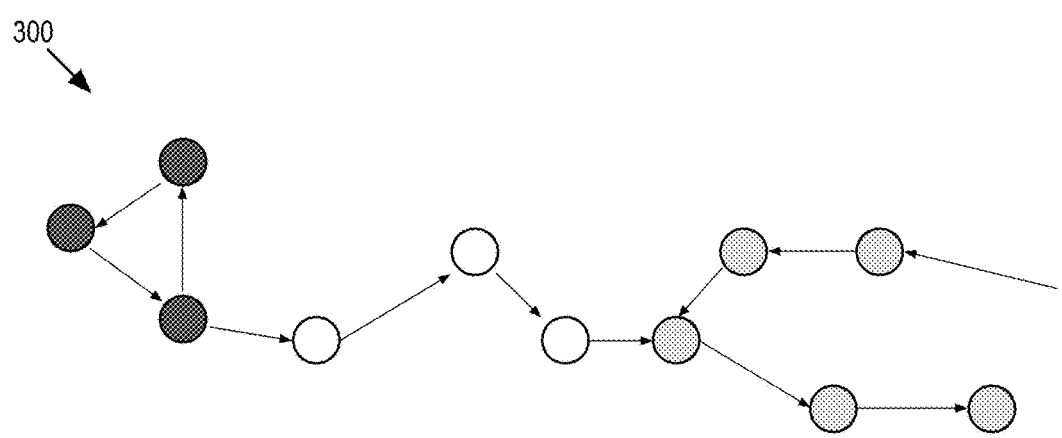
FIG. 3 depicts a graph of communications according to an embodiment of the disclosure.

FIG. 3 illustrates a graph 300 for a group of persons (e.g., three persons depicted as black, grey and white nodes). Specifically, for example, the nodes for a person are depicted in black, the nodes for another person are depicted in white, and the nodes for yet another person are depicted in grey. The graph 300 may be built for all persons in the group or constructed by combining graphs for individual persons. In some embodiments, the nodes of the graph 300 may be associated with identities of the persons. In some embodiments, the graphical text analyzing module 106 may discard or anonymize the graphs of communications stored in the graphs repository 112 for reasons of privacy, after graphical text analysis is performed on those graphs. Analysis of groups of users may be useful in categorizing a user's cognitive trait within different contexts, for example while on a phone call with other specific individuals.

The graph constructing module 104 updates the graphs as more text from the device user 118 is received from the communications obtaining module 102 as the device user 118 make more communications. The graph constructing module 104 stores the generated graph(s) for the device user 118 in the graphs repository 112.

The graphical text analyzing module 106 performs a graphical text analysis on the graph generated by the graph constructing module 104. As a specific example of a graphical text analysis, in some embodiments, the graphical text analyzing module 106 analyzes the graph G for the person generated by the graph constructing module 104 based on a variety of topological features. The variety of features includes graph-theoretical topological measures of the graph skeleton (i.e., a graph without features vectors: $G_{Sk}=\{N, E\}$) such as degree distribution, density of small-size motifs, clustering, centrality, etc. Similarly, additional values may be extracted by including the features vectors for each node of the graph. One such instance is the magnetization of the generalized Potts model (e.g., $H=\Sigma_n E_{nm} \breve{W}_n T \breve{W}_m$) such that temporal proximity (e.g., number of edges between two nodes) and feature similarity are taken into account. These features, which incorporate the syntactic, semantic and dynamical components of the communications, are then combined as a multi-dimensional features vector $\breve{F}$ that represents a sample. This feature vector is finally used to train a standard classifier: $M=M(\breve{F}_{train}, C_{train})$, to discriminate the samples that belong to different conditions C, such that for each sample the classifier estimates its condition identity based on the extracted features: $C(sample)=M(\breve{F}_{sample})$.

In some embodiments, when the device user 118 is a group of persons, the graphical text analyzing module 106 may give different weights to the nodes for different persons in the group based on various factors. For example, the nodes for a main user get bigger weights than the nodes for the secondary users do. In some embodiments, when the device user 118 is an individual person, the graphical text analyzing module 106 assigns different weights to different nodes based on various factors. For example, the further into the past a communication represented by a node occurs, the lower the weight of the node that the graphical text analyzing module 106 assigns.

The clusters repository 110 stores different clusters of graphs that represent different predefined cognitive traits. Examples of different cognitive traits include interests, knowledge, goals, desires, emotional traits (e.g., anger, frustration, irritation, happiness, satisfaction, calmness, anxiousness, etc.). In some embodiments, the graphs and clusters are prepared based on the communications that authorized persons or authorized groups of persons have made previously.

The graphical text analyzing module 106 compares the graph for the device user 118 with the clusters of previously generated graphs stored in the clusters repository 110 in order to determine current cognitive trait of the device user 118. Specifically, the feature vectors of previously generated graphs are plotted in a multi-dimensional text feature space to form clusters in that space. The graphical text analyzing module 106 plots the feature vectors of the graph for the device user 118 in the space in order to determine whether the graph belongs to a cluster based on, e.g., distance between the plots of the graph and the plots of the clusters. If the plots of the graph fall in the feature space of a particular cluster, the corresponding discussion trait represented by the cluster is determined as the cognitive trait of the device user 118. The cognitive trait of the device user 118 may change as the graph of the communications for the device user 118 is updated by the graph constructing module 104. In some embodiments, the graphical text analyzing module 106 also determines for each cluster the level of correlation between the graph and the cluster (e.g., a likelihood of the graph to belong to the cluster, a distance between the plots of the graph and the plots of the clusters in the features space, etc.). The graphical text analyzing module 106 notifies the security measure deploying module 108 of the cognitive trait of the device user 118 as well as the data that indicate the level of correlation between the graph and the cluster corresponding to the cognitive trait.

The cognitive identities repository 114 stores the predefined cognitive identities and profiles of the persons or groups of persons who are authorized to use the electronic device 116. In some embodiments, a cognitive identity is a history of cognitive traits of an authorized person or a group of persons, and a cognitive identity serves as a unique identity of the person or the group of persons. In some embodiments, a history of cognitive traits also includes the data that indicate the level of correlation between the graphs for the person or the group of persons and the clusters representing the cognitive traits in the history.

The security measure deploying module 108 compares the cognitive traits determined by the graphical text analyzing module 106 with the cognitive identity of a targeted authorized person or a targeted group of persons, in order to determine whether the device user 118 is authorized to use the electronic device 116. More specifically, in some embodiments, the security measure deploying module 108 communicates with the electronic device 116 and receives or retrieves an identifier of the electronic device 116. Using the identifier of the electronic device 116, the security measure deploying module 108 identifies a user or a group of users authorized to use the electronic device 116 and selects the cognitive identity of the user or the group of users from the cognitive identities repository 114. Alternatively or conjunctively, the security measure deploying module 108 may use a user identifier, which is authenticated at the electronic device (e.g., by entering password/passcode, by providing a fingerprint, by showing a face, etc.), to select a cognitive identity from the cognitive identities repository 114.

By comparing the cognitive trait determined by the graphical text analyzing module 106 with the selected cognitive identity, the security measure deploying module 108 determines whether the cognitive trait deviates or diverges from the selected cognitive identity beyond the predefined tolerance or threshold (i.e., whether the discrepancy between the cognitive trait and the selected cognitive identity exceeds a threshold). As described above, a cognitive identity includes historical cognitive traits of an authorized person or group of persons. If the cognitive trait of the device user 118 diverges or deviates from the historic cognitive traits for more than a threshold, the security measure deploying module 108 deploys one or more security measures at the electronic device. More specifically, for example, the security measure deploying module 108 determines whether an average distance to the clusters representing the cognitive traits of the device user 118 and an average distance to the clusters representing the cognitive traits of the authorized person or group differ by more than a threshold value. As another example, the security measure deploying module 108 determines whether a (running) average likelihood of the graphs for the device user 118 to belong to the clusters differ by a threshold likelihood from an average likelihood of the graphs for the authorized user(s) to belong to the clusters. As yet another example, the security measure deploying module 108 determines whether the sequence of cognitive traits for the device user 118 differ from the sequence of cognitive traits serving as the cognitive identity of the authorized user(s).

If the cognitive trait of the device user 118 diverges or deviates from the selected cognitive identity beyond a threshold, the security measure deploying module 108 deploys one or more security measures at the electronic device 116. The security measures that the security measure deploying module 108 may deploy includes showing warning messages to the device user 118 through the electronic device 116, limiting the device user's ability to use the electronic device 116, sending one or more alert messages to one or more other devices that the authenticated user(s) use, locking out the device user 118 from the electronic device 116, etc. As such, the functioning of the system 100, which may be implemented in a computer system (e.g., computer system 12 described further below with reference to FIG. 5), may be improved.

In some embodiments, the system 100 may also note any irregular interaction with the electronic device 116 (e.g., when the electronic device 116 is a smartphone or a kiosk) is a haptic interaction or activity such as a rate or pressure of the interaction with a user interface 120 (e.g., a graphical user interface (GUI) based keyboard, a touch screen, etc.) that is uncharacteristic with prior interactions with the user interface 120. Thus, in addition to the speech communications of the device user 118, these haptic interactions and communications may be subject to graphical analysis and considered in determining whether the device user 118 is an authorized user. To aid in the information gathering, some embodiments of the present disclosure provision a plurality of software modules (not shown) receiving a plurality of device activity data concerning one or more activities of the electronic device 116, software executing on the electronic device 116 for presenting, via the user interface 120, a prompt for first device activity data indicative of a past activity of the electronic device 116, software executing on the electronic device 116 for receiving a response to the prompt via the user interface 120, and software executing on the electronic device 116 for verifying the accuracy of the response and unlocking the electronic device 116 if the response corresponds to the first device activity data.

In some embodiments, the security measures deployed by the system 100 may be related to use of a mobile computing device (e.g., the electronic device 116). In some of these embodiments, the mobile computing device may be used to arm or disarm a building security system, and it may include transferring an electronic security credential file from an authorizing environment to a mobile computing device. The graphical text analysis described above may be used to facilitate arming or disarming the building security system by the mobile computing device in a secure manner. More specifically, the electronic security credential file is read by the mobile computing device to extract authentication data. Then, a user's other recent communications associated with the device may be analyzed. The authentication data, which includes the results of the graphical text analysis, is transmitted from the mobile computing device and received at the building security system. Within the building security system, the authentication data is used to verify that a user of the mobile computing device is authorized to communicate with the building security system. The mobile computing device is enabled to communicate with the building security system only if the electronic security credential file has been used to verify that a user of the mobile computing device is authorized to communicate with the building security system.

In some embodiments, at least part of the system 100 is implemented in the electronic device 116. That is, for instance, the electronic device 116 may perform the text obtaining, the graph constructing, the graphical text analysis and/or security measures triggering described above. In other embodiments, the electronic device 116 is a device (e.g., a smartphone) that is only remotely connected to the system 100, which performs the text obtaining, the graph constructing, the graphical text analysis and/or security measures triggering.

Figure 4:
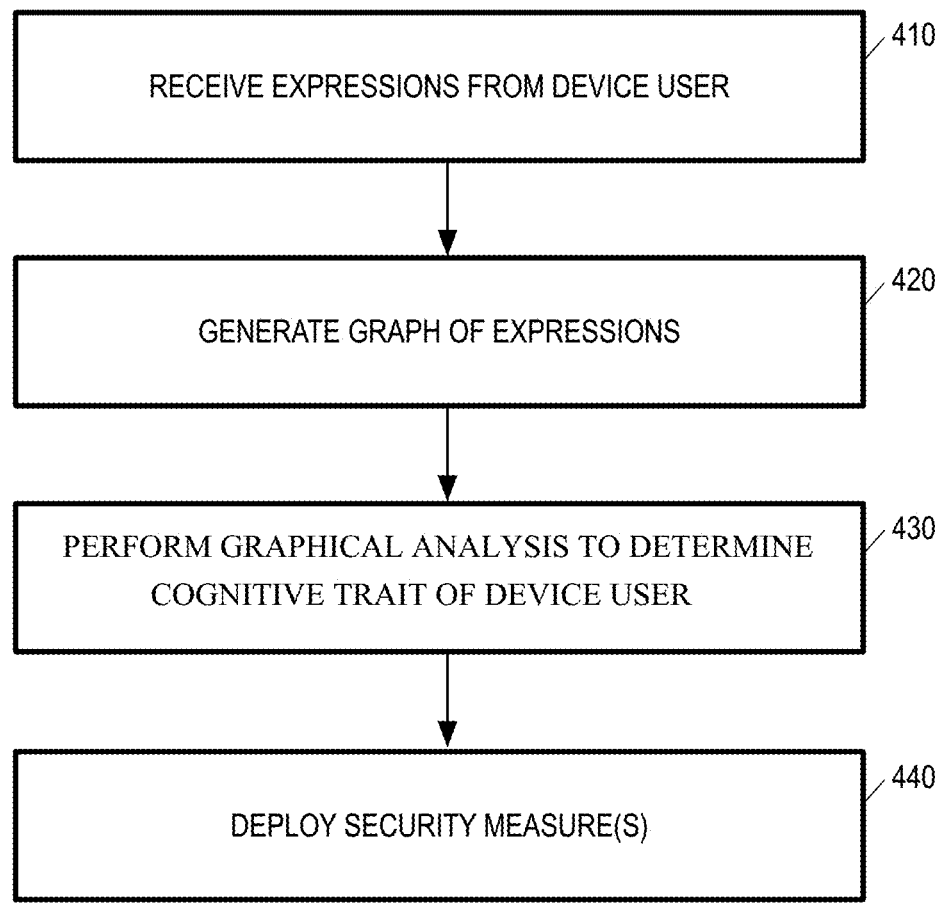
FIG. 4 depicts a process flow for securing an electronic device according to an embodiment of the present disclosure.

FIG. 4 illustrates a process flow for securing an electronic device based on graphical text analysis of graphs of communications. In some embodiments, the system 100 performs the process flow shown in FIG. 4. At block 410, the system 100 receives communications from a device user. In some embodiments, the communications are gathered at the electronic device 116 from the device user. In some embodiments, the system 100 may monitor the device user's haptic interaction with the electronic device 116 to determine whether the device user's haptic interaction is uncharacteristic of the authorized user.

At block 420, the system 100 generates a graph of communications of the device user. In some embodiments, a device user comprises a person teamed up with an avatar operating in the electronic device. The generating the graph of communications of the device user comprises generating a graph of communications of the person and the avatar.

At block 430, the system 100 performs a graphical text analysis on the graph to determine a cognitive trait of the device user and a discrepancy between the cognitive trait and a cognitive identity of an authorized user. The cognitive identity of the authorized user is predefined based on communications that are previously made by the authorized user and are previously received at the electronic device and at one or more other electronic devices that the authorized user used. In some embodiments, the authorized user comprises a group of persons who are authorized to use the electronic device.

At block 440, the system 100 deploys at least one security measure on the electronic device in response to determining that the discrepancy is greater than a threshold. The security measure comprises at least one of: showing one or more warning messages to the device user through the electronic device, limiting the device user's ability to use the electronic device, sending one or more alert messages to one or more other devices to notify an authorized user of a possible breach of security to the electronic device, and locking out the device user from the electronic device, In some embodiments, as a security measure, the system 100 uses an avatar operating in the electronic device to respond to queries regarding the device user's current cognitive trait and any change in the cognitive trait. The avatar is constructed based on communications that are previously made by the authorized user. In some embodiments, the avatar interacts with other avatars of the authorized user that operate in, e.g., social networking servers. In some embodiments, the security measure that can be deployed comprises triggering the other avatars to send queries to the electronic device for the avatar to respond, in order to verify that the change in the cognitive trait is a true security threat.

It is understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, trait, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
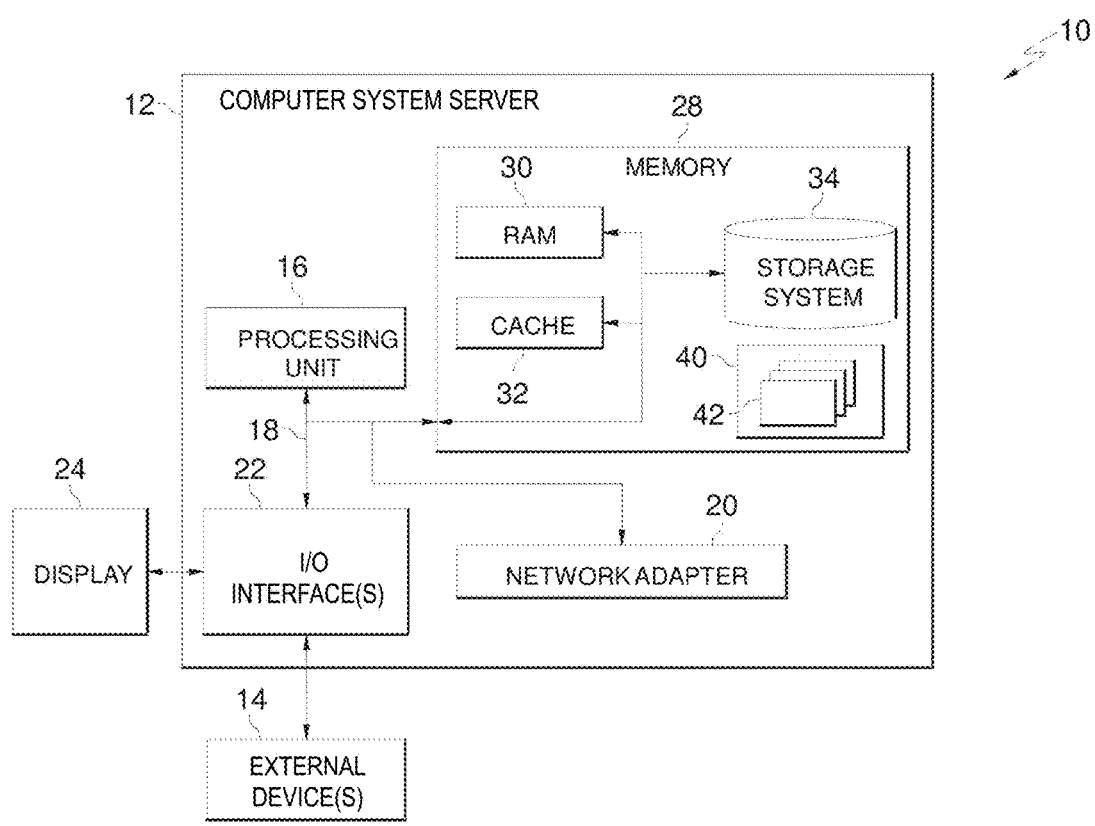
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
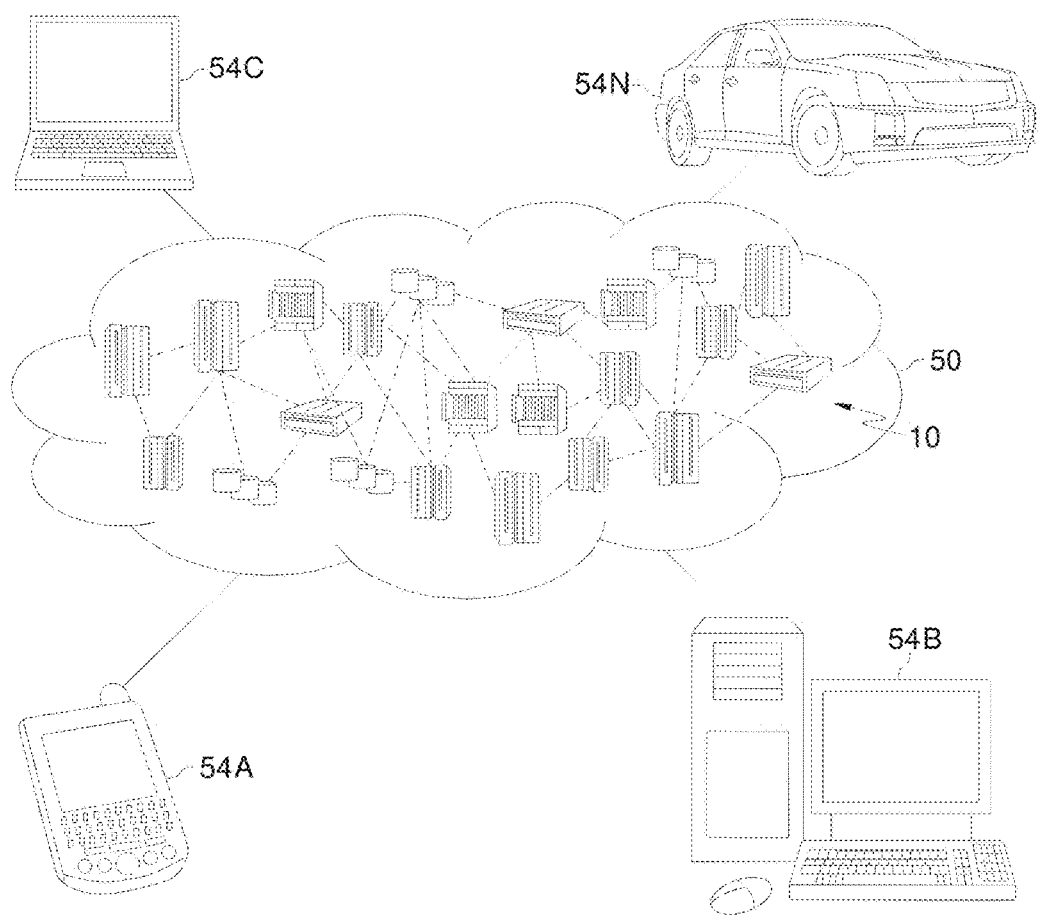
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
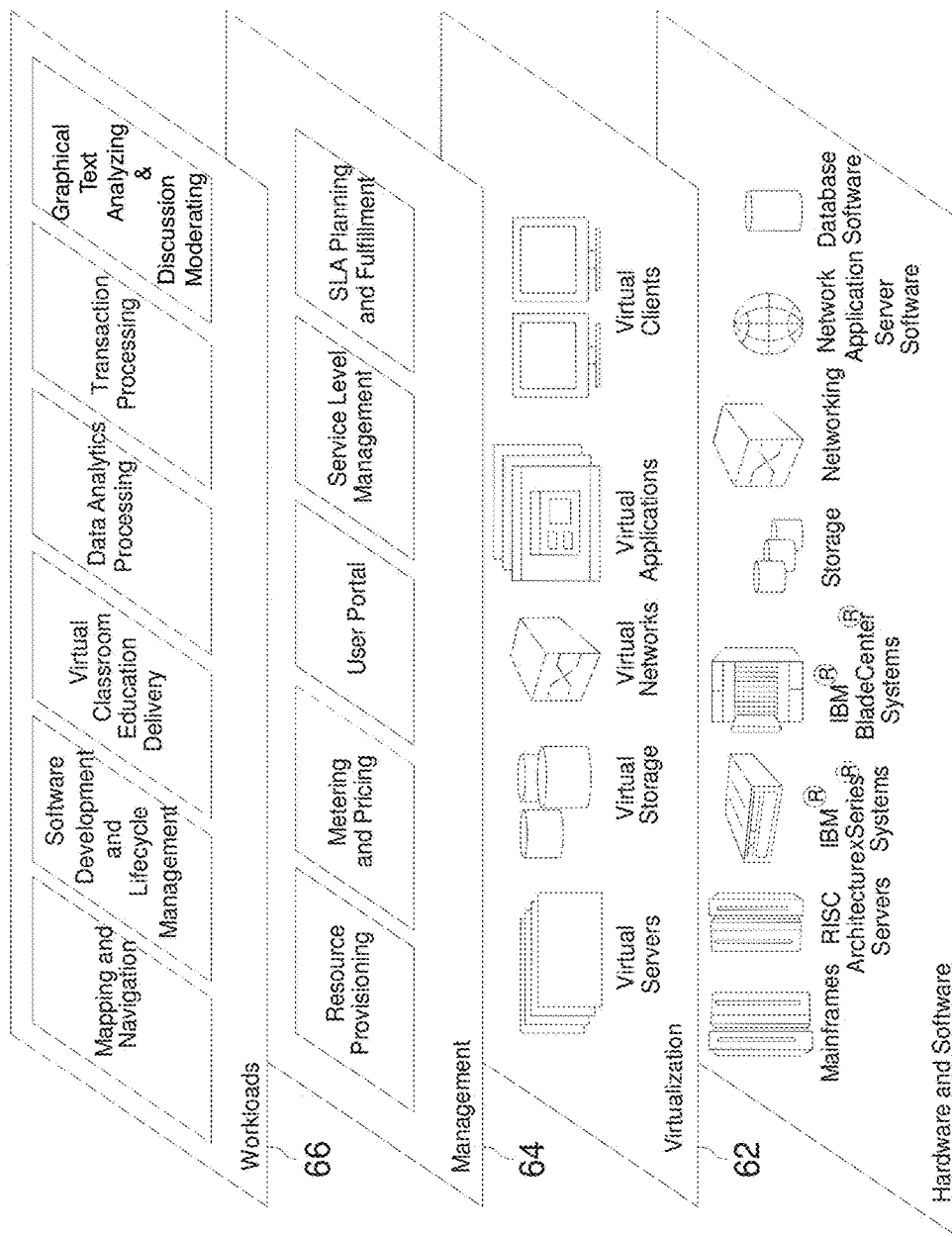
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the present disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and graphical text analyzing and discussion moderating.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, trait-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing trait information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for securing an electronic device, comprising:
   receiving, by at least one processor of a computer, at least one communication from an entity seeking to access the device, the communication comprising speech data;
   generating, by the at least one processor, a graph of words in the speech data from the at least one communication from the entity seeking access to the device, the words obtained by converting the speech data to text, wherein nodes in the graph represent the words and edges in the graph represent temporal precedence of the nodes;
   measuring, by the at least one processor, a pressure of haptic interaction from the entity seeking access to the device, wherein the haptic interaction comprises interaction with a graphical user interface;
   determining a current cognitive trait of the entity seeking access to the device by:
      performing a semantic text analysis of the graph of words, and
      analyzing the pressure of haptic interaction;
   determining a difference between the current cognitive trait of the entity seeking access to the device and a cognitive identity of an entity authorized to access the device, wherein the cognitive identity is selected from different predefined cognitive traits that are associated with the entity, the predefined cognitive traits comprising goals, desires, and emotional traits; and
   based at least in part on a determination that the difference is greater than a threshold, deploying a security measure of the device;
   wherein the entity comprises a group of users such that nodes in the graph are associated with the group of users seeking access to the device being secured, the group of users seeking access to the device having different weights for the nodes in the graph.

2. The method of claim 1, wherein:
   the cognitive identity is predefined based at least in part on at least one communication from the entity authorized to access the device; and
   the cognitive identity is further predefined in a context-specific manner, wherein the context is an identity of an entity with which the entity authorized to access the device is speaking.

3. The method of claim 1, wherein the security measure comprises:
   displaying at least one warning message;
   limiting a functionality of the device;
   sending at least one alert message to the entity authorized to access the device to notify the entity authorized to access the device of a possible attempted security breach; and
   locking the device from further attempts to access it.

4. The method of claim 1, wherein analyzing the pressure of haptic interaction comprises determining whether the pressure of haptic interaction conflicts with a characteristic of the entity authorized to access the device.

5. The method of claim 1, wherein the emotional traits comprise anger, frustration, irritation, happiness, and satisfaction.

6. The method of claim 1, wherein the group of users comprises a primary user and secondary users seeking access to the device being secured such that the primary user seeking access to the device being secured has a larger weight in the graph than secondary users seeking access to the device being secured.

7. The method of claim 1, wherein values are extracted from the graph, the values including features vectors for each node of the graph;
   wherein one of the feature vectors comprises a magnetization of a generalized Potts model such that temporal proximity and feature similarity are taken into account;
   wherein the feature vectors, incorporating a syntactic component, a semantic component, and dynamical component of the communication associated with the group of user seeking access to the device being secured, are combined as a multi-dimensional features vector $\check{F}$ that represents a sample; and
   wherein the multi-dimensional features vector $\check{F}$ is utilized to train a classifier to discriminate samples that belong to different conditions C, such that for each of the samples the classifier estimates a condition identity.

* * * * *